United States Patent [19]
Green

[11] 3,761,750
[45] Sept. 25, 1973

[54] SUBMERSIBLE ELECTRIC MOTOR

[75] Inventor: Ronald E. Green, Davenport, Iowa

[73] Assignee: Red Jacket Manufacturing Company, Davenport, Iowa

[22] Filed: Jan. 24, 1972

[21] Appl. No.: 220,100

Related U.S. Application Data

[63] Continuation of Ser. No. 68,323, Aug. 31, 1970, abandoned.

[52] U.S. Cl. .................................................. 310/87
[51] Int. Cl. ............................................. H02k 5/10
[58] Field of Search .................. 310/87, 89, 71, 88, 310/43, 91, 68, 72; 103/87; 318/195

[56] References Cited
UNITED STATES PATENTS

| 3,457,866 | 7/1969 | Komor | 310/87 X |
| 3,248,582 | 4/1966 | Brown | 310/87 |
| 2,997,609 | 8/1961 | Lung | 310/87 |
| 3,308,316 | 3/1967 | Pfahl | 310/87 |

Primary Examiner—R. Skudy
Attorney—Vernon J. Pillote

[57] ABSTRACT

A well casing extends to ground level and has a pump and a submersible single-phase induction motor therein. The motor has main and start windings connected to a three-lead connector at its upper end and a two-lead connector at its lower end. A capacitor may be mounted below the motor and connected via the two-lead connector, or it may be located at ground level and connected via the three-lead connector.

1 Claim, 9 Drawing Figures

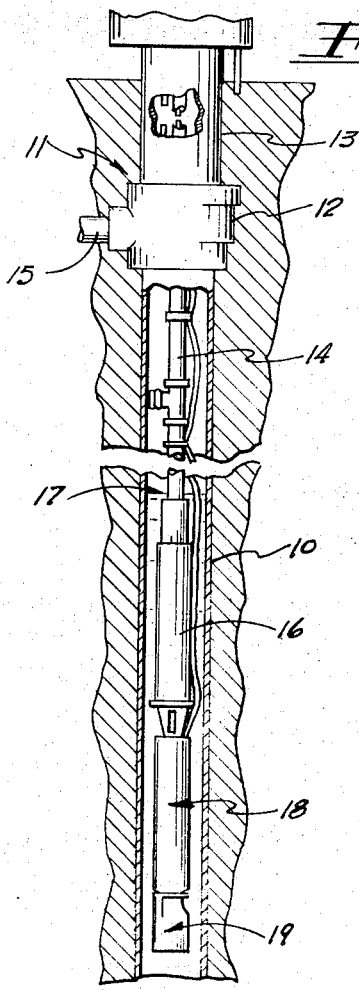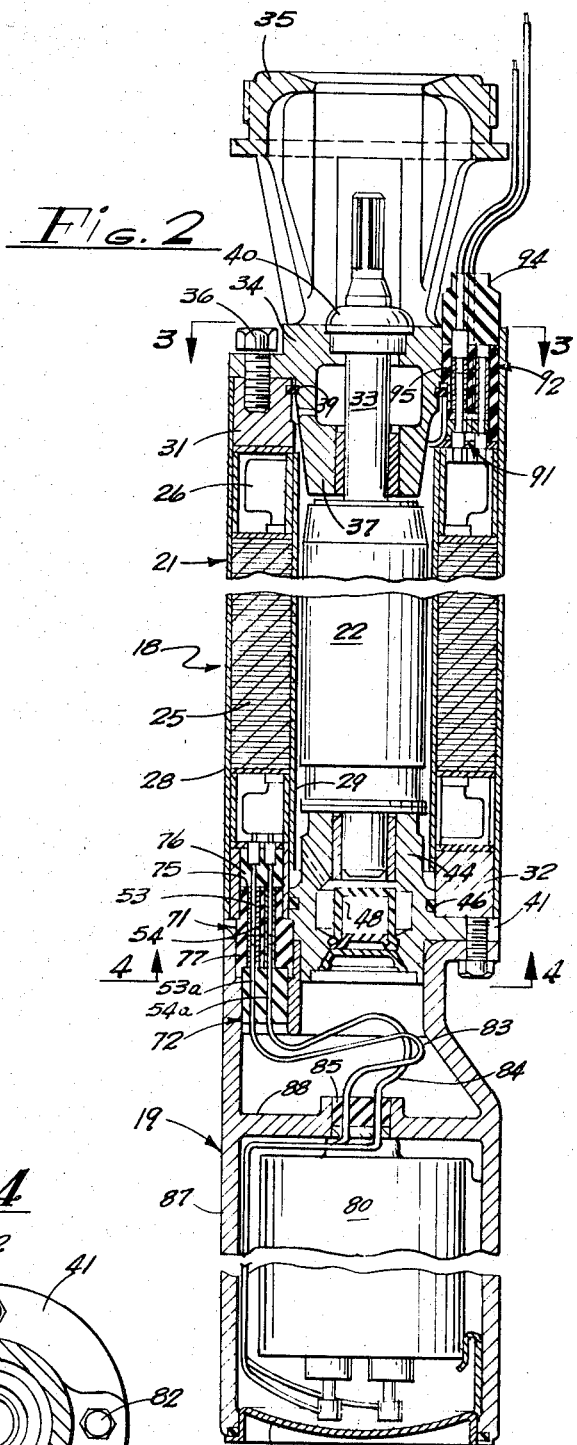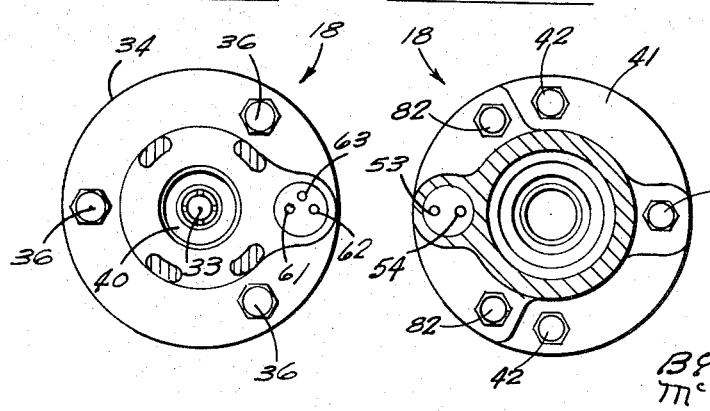

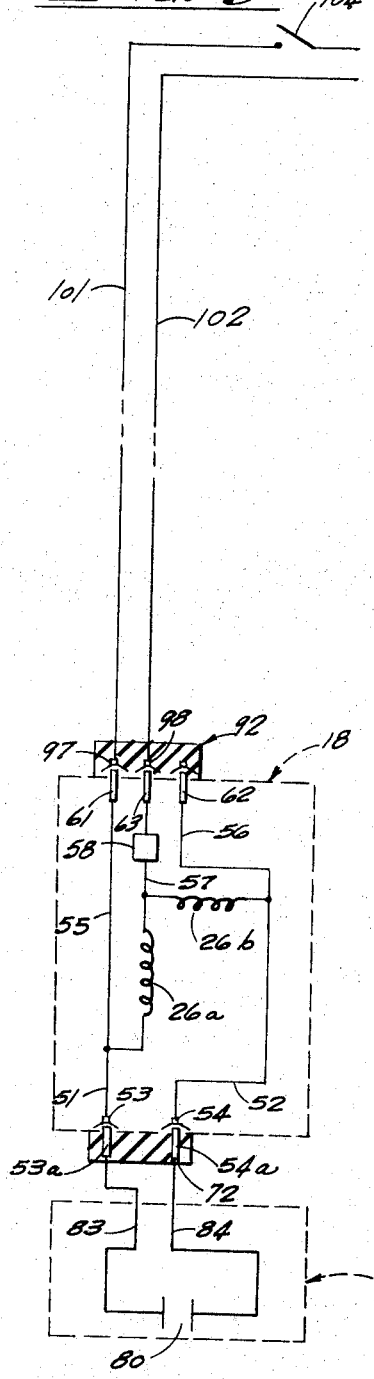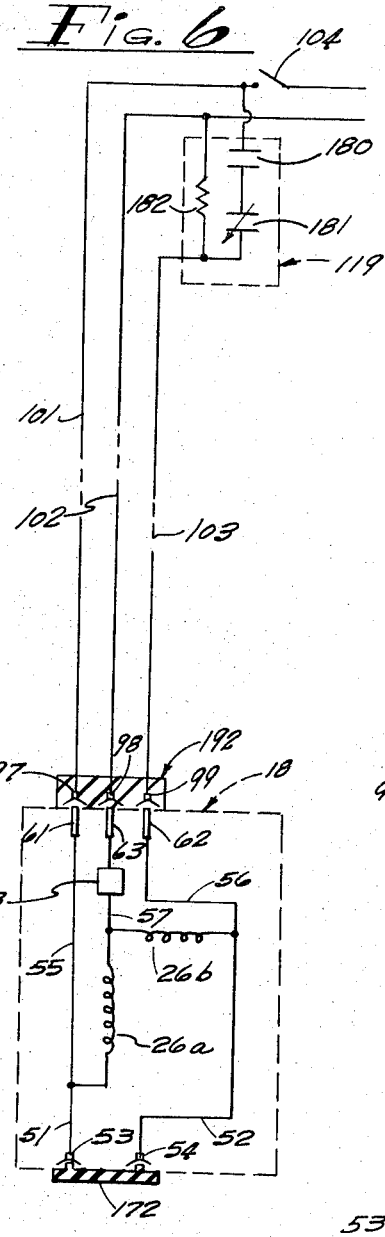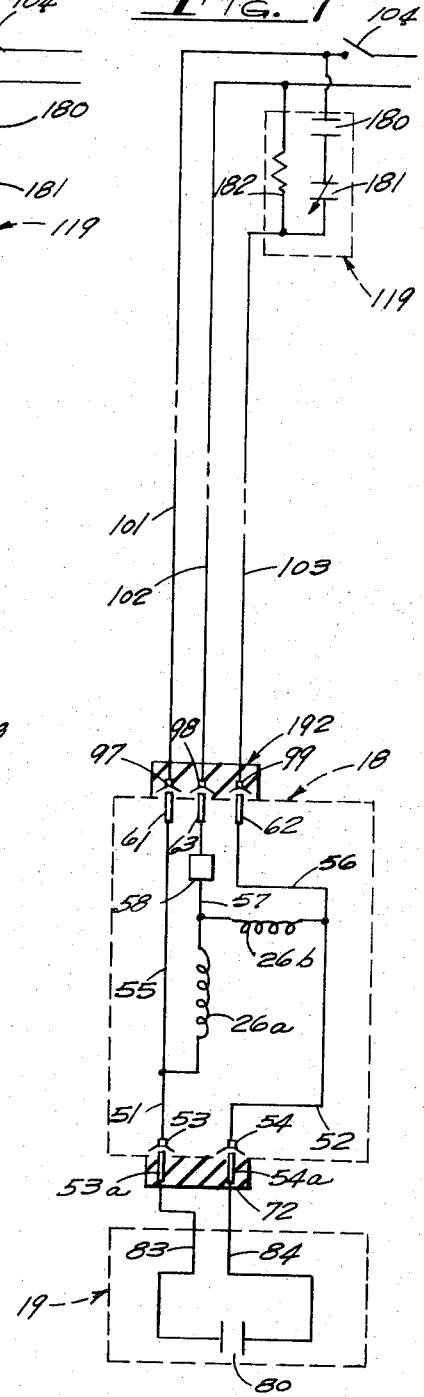

Fig. 9
Fig. 8
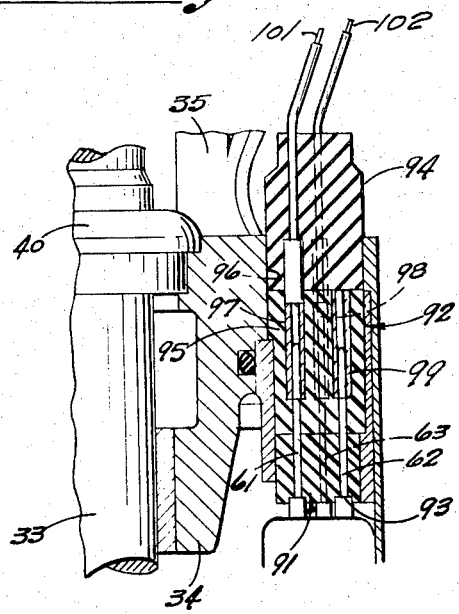
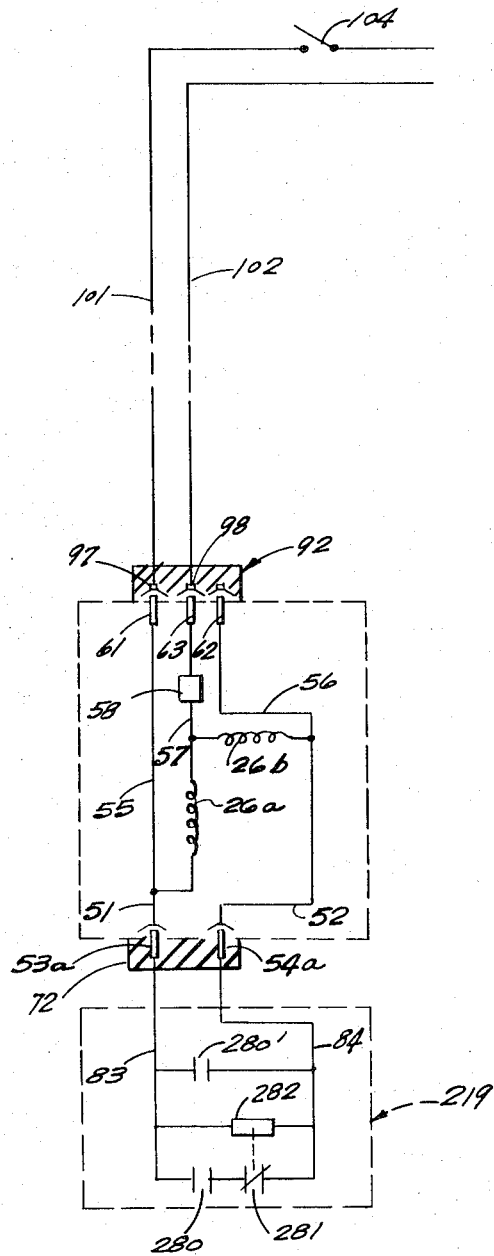
INVENTOR.
Ronald E. Green
BY McCanna, Morsbach, Pillote + Muir
ATTORNEYS.

SUBMERSIBLE ELECTRIC MOTOR

RELATED APPLICATION

This is a continuation of the co-pending application, of Ronald E. Green, Ser. No. 68,323, filed Aug. 31, 1970, for "Fluid Pumping System", now abandoned.

BACKGROUND

The invention pertains to fluid pumping systems of the type including a pump and a submersible electric motor in a casing, such as a well casing.

Single-phase induction motors having main and start windings and three leads to the windings, are commonly used in submersible motor units. It is also common to use a motor capacitor in the circuit to the start winding to shift the phase. In some installations, the motor capacitor has been located remote from the motor, as in an enclosure at the top of the well casing. Such installations require three wires in the well casing to supply power to the motor and to connect the motor capacitor in circuit. Motors used in such installations are commonly called three-wire motors.

To enable the use of only two wires in the well casing, it has heretofore been proposed to locate the motor capacitor at the motor and operate the motor either as a permanent split capacitor type or as a capacitor start by also providing a current or speed responsive switch at the motor for cutting out the start capacitor. In some installations, the motor capacitor was positioned within the sealed motor enclosure. This, obviously, requires a special motor construction and complicated checking, or replacement of the motor capacitor. Motor capacitors in separate imperforate units have also been utilized, such as illustrated in U.S. Pat. No. 3,248,582. Both types require special motor constructions to adapt the motors for two-wire connection to the power supply. Motors such as these have become known as two-wire motors.

Thus, different motor constructions (i.e., two-wire and three-wire motors) have been required for different installations, as described above. As a result, different motors have been manufactured, supplied, and stocked.

To enable the use of one motor type for both two-wire and three-wire installations, U.S. Pat. No. 3,457,867 proposed four external wires connected to a three lead connector at the upper end of the motor. The capacitor was mounted below the motor and two wires extended from the connector externally of the motor to the capacitor. This necessitated a protruding guard to prevent the wires from being damaged when the unit was installed in the casing. The protruding guard increases the effective diameter of the motor and limits its use. In addition, the guard must be carefully secured to assure against its being accidentially knocked off. It is desirable to provide an improved arrangement in which one motor type can be utilized for both two-wire and three-wire installations.

SUMMARY

The present invention relates to a fluid pumping system of the type including a pump and a submerible motor disposed in a casing, and to an improved submersible motor for use in such a system.

An important object of the present invention is to provide a fluid pumping system of the type described and including an improved submersible motor which may be utilized in either a two-wire or three-wire arrangement.

Another object of this invention is to provide an improved submersible motor construction which can be used in combination with a motor control component mounted at the motor with a two-wire lead in, or remote from the motor with a three-wire lead in.

Yet another object of the present invention is to provide a fluid pumping system including an improved submersible motor construction which adapts the motor for wide utility.

These, and other objects and advantages of the present invention, will become apparent as the same becomes better understood from the following detailed description when taken in conjunction with the accompanying drawings.

DRAWINGS

FIG. 1 is a fragmentary vertical sectional view through a well which incorporates the fluid pumping system of the present invention;

FIG. 2 is a vertical sectional view through the motor and the capacitor unit;

FIG. 3 is a view taken generally along line 3—3 of FIG. 2 and with the upper plug-in connector removed;

FIG. 4 is a view taken generally along line 4—4 of FIG. 2 and with the lower plug-in connector removed;

FIGS. 5–8 are diagrammatic views illustrating various electrical circuits in which the motor may be utilized; and FIG. 9 is an enlarged fragmentary sectional view of the upper plug-in connector.

DESCRIPTION

Reference is now made more particularly to the drawings which illustrate the best presently known mode of carrying out the invention and wherein similar reference characters indicate the same parts throughout the several views.

In FIG. 1, the invention is shown as applied to a well which has a well casing extending from a point above the ground downwardly into the well opening in accordance with standard practice in encasing wells. The well casing includes a conventional casing tube 10 which normally extends downwardly to the aquifer or is terminated in a well screen (not shown). The upper end of the casing tube 10 may terminate at a point below the frost level of the ground. Attached to the upper end of the casing tube in a water tight manner is a pitless underground unit, generally designated 11, which customarily includes a discharge head 12 and a casing extension 13 which extends to a point above the ground level. The discharge head 12 is preferably of the type having a removable packer unit (not shown) which spans the discharge head and communicates a downwardly extending drop pipe 14 with a lateral discharge pipe 15 on the discharge head 12. The drop pipe 14 extends downwardly in the casing to a pump unit 16 submerged in a fluid such as water, designated by the numeral 17. A submersible electric motor 18 is attached to the pump 16 to drive the same and, in one arrangement, a capacitor unit 19 is located below the motor.

The submersible motor 18 is preferably a single-phase induction motor. As shown in FIG. 2, the motor includes a stator body 21 and a rotor 22 disposed in the stator body. The stator body comprises a laminated core structure 25 having motor windings 26 which a main winding 26a and a start winding 26b (see FIGS. 5-7). The core and windings are disposed within an imperforate outer shell 28. The motor windings 26 are preferably sealed and, for this purpose, an inner tubular member or liner 29 is disposed within the core, and ring members 31 and 32 are provided at opposite ends of the stator and sealed to the outer shell 28 and to the liner 29 to form a sealed enclosure for the stator windings. In this manner, the stator is sealed. The rotor 22, disposed in the stator, has a motor shaft 33 extending outwardly of the motor enclosure for connection to the pump 16. An upper end member 34 overlies the stator ring member 31 and is removably mounted by fasteners 36. The upper end member 34 conveniently includes a bearing hub 37 extending axially from one side of the end member into the rotor chamber and has an O-ring 39 which engages the ring member 31. A shaft seal 40 is provided on the motor end member to seal the inner face with the shaft 33. A fitting 35 is conveniently formed integrally with the upper end member 34 for attachment to the pump unit 16 to mount the motor thereon.

The lower end of the motor 18 is enclosed by an end member 41 which overlies the stator ring member 32 and is secured thereto by a plurality of fasteners 42 (see FIG. 4). The end member 41 extends into the ring member 32 and carries a bearing hub 44 for rotatably supporting the lower end of the shaft 33. The lower end member 41 is sealed to the ring member 32 as by an O-ring 46, thereby cooperating with the aforedescribed structure to provide an imperforate motor housing. The chamber containing the rotor is advantageously filled with a fluid (not shown) having suitable lubricating characteristics. In order to accommodate thermal expansion and contraction of the fluid, a movable wall or expansion chamber 48 is mounted on the end member 41 and has one side exposed to the fluid in the rotor chamber.

Referring now to FIGS. 5-7, the wiring in the sealed stator will be described. A first main lead 51 and a first start lead 52 are respectively connected to the main winding 26a and start winding 26b. These leads extend to electrical prongs 53 and 54 at the lower end of the stator. A second main lead 55 is connected to the main winding 26a and a second start lead 56 is connected to the start winding 26b. A common lead 57 is connected to both windings and has an overload switch 58 interposed therein. Leads 55–57 extend to prongs 61–63, respectively, at the upper end of the stator. The above-described leads are all carried in the sealed stator.

A first plug-in type electrical disconnect including first and second connector members, designated generally as 71 and 72, is provided on the lower end of the motor to enable connection of a motor control component such as capacitor unit 19 (See FIG. 2). The disconnect is mounted on the motor housing in sealed relation therewith and with the stator. Preferably the disconnect is located in one limited area of the lower end, as shown in FIG. 4. A bore 75 is formed in ring member 32 and is spaced radially from the center of the stator. The first connector member 71 includes a first insulating body 76 mounted at the inner end of the bore 75 and carrying the electrical prongs 53 and 54. A second insulating body 77 is mounted in the bore and carries two socket members each associated with one of the lead prongs 53 or 54. As shown, the second body 77 extends into a bore in the casting of the capacitor unit.

The second connector member or plug-in disconnect 72 includes a plug portion dimensioned to be received in the bore of the capacitor casting. Two metal prong connectors 53a and 54a are embedded in the connector member 72 and are arranged to interfit with the two socket members to electrically connect the connectors 53a and 54a with the lead prongs 53 and 54.

In accordance with the present invention, leads 51 and 52 may be selectively connected to a motor capacitor 80 mounted at the bottom of the motor 18. As indicated in FIGS. 5 and 7 the motor capacitor 80 is a running capacitor. The motor capacitor 80 is enclosed in a sealed case which is separate from the motor housing. The case is mounted at the lower end of the motor housing by means of fasteners 82 (see FIG. 4). The case is conveniently in the form of a casting having a side wall 87, an intermediate end wall 88, and a removable lower end wall 89. Lower end wall 89 is fitted in an opening of sufficient size for insertion and removal of the motor capacitor 80 therethrough. Wires 83 and 84, connected to the capacitor 80, conveniently pass through an opening in intermediate wall 88 which is sealed as by an epoxy 85 to provide a sealed portion of the casing for the motor capacitor 80. Wires 83 and 84 extend to the second connector member 72 and are connected to the prongs 53a and 54a. The wires 83 and 84 conveniently extend into the capacitor chamber adjacent to the lower end thereof for connection to the motor capacitor, as shown in FIG. 2. The capacitor chamber can be partially filled with an inert insulating material (not shown) if desired. Alternatively, a plastic capacitor case may be utilized and sealed in any convenient manner, as by epoxy.

Another plug-in type electrical disconnect including third and fourth connector members, designated generally as 91 and 92, is provided on the upper end of the motor to enable connection of the stator windings 26a and 26b to the power supply, as best seen in FIG. 9. The disconnect is mounted on the motor housing in sealed relation therewith and preferably in one limited area of the upper end, as shown in FIGS. 2 and 3. A bore 93 is formed in the ring member 31 and is spaced radially from the center of the stator. The third connector member 91 includes a first insulating body mounted at the inner end of bore 93 and carrying the electrical prongs 61–63.

The fourth connector member, or plug-in disconnect, 92 includes insulating bodies 94 and 95 mounted in a stepped bore 96 in the end member 34. Insulating body 95 carries three socket members 97–99 each associated with one of the lead prongs 61–63. In the embodiment illustrated in FIGS. 2, 5 and 9, disconnect 92 provides a connection to a two-wire lead in the casing 10. As shown, the socket members 97 and 98 are arranged to electrically connect the lead prongs 61 and 63 with wires 101 and 102.

The insulating bodies of the above-described connector members may be formed of various suitable dielectric materials, and are advantageously formed of a resilient dielectric material such as rubber. While particular plug-in disconnects have been illustrated and described, it is apparent that other constructions could be utilized, if desired. For example, individual plug-in disconnects can be used instead of the multiple type illustrated, or the plug-in disconnect may be of the type illustrated in U.S. Pat. No. 3,294,933.

The wiring arrangement for the above-described embodiment is shown in FIG. 5. Wires 101 and 102 extend in the casing 10 and are connected to the socket members 97 and 98 in the disconnect member 92. A start switch 104, of any suitable construction is interposed in wire 101 in the usual manner. In this embodiment, the motor 18 is utilized with a capacitor mounted below the motor and connected thereto by way of the connector members 71 and 72 at the lower end of the motor. The connector member 92 at the top of the motor electrically connects to only lead prongs 61 and 63 while sealing the other lead prong 62. In this manner, the motor may be utilized with a two-wire lead-in and with a motor control component at the lower end of the motor.

FIG. 6 illustrates an arrangement in which the motor 18 is utilized with a three-wire lead-in and with a motor control component remote from the motor as, for example, in the underground unit 11. In the embodiment of FIG. 6, the lower connector member is sealed by a plug 172 which may be compressed in the socket by any convenient means. The three lead-in wires 101–103 extend to a disconnect plug 192 which carries the aforedescribed sockets 97 and 98, and the third socket 99 connected to wire 103. A remote capacitor unit 119 is located in the underground unit 11 or elsewhere remote from the motor 18. In the embodiment illustrated, the capacitor unit 119 includes a capacitor 180 and a switch 181 interposed in the wire 103. The switch 181 is normally closed so that the capacitor 180 is operative for the starting function of the motor 18. When the motor 18 reaches speed, a current responsive starting relay 182 opens switch 181 breaking the circuit through the capacitor 180. Thus, capacitor 180 is a starting capacitor and switch 181 is a starting switch.

In the embodiment of FIG. 7, the three-wire arrangement of FIG. 6 with a starting capacitor is used in parallel with a running capacitor unit 19 at the lower end of the motor. It is deemed obvious that the desired characteristics of the various capacitors may vary depending on the desired usage, and that the capacitors will be selected in accordance with good design principles.

In the embodiment of FIG. 8, a two-wire arrangement similar to FIG. 5 is utilized with a capacitor unit 219 mounted at the lower end of the motor 18. Capacitor unit 219 includes a capacitor 280 and a switch 281 wired in series between wires 83 and 84. The switch 281 is normally closed so that capacitor 280 is operative for the starting function of the motor 18. A relay 282 is arranged to throw switch 281 and switch out the start capacitor 280 when the motor reaches speed. As shown, a running capacitor 280' wired in parallel with capacitor 280.

From the foregoing, it is thought that the construction and operation of the apparatus will be readily understood. The fluid supply system includes a pump, a submersible motor having either a two-wire or a three-wire connector at its upper end and a motor control component at its lower end, or remote from the motor as at the header, or in both locations. Thus it can be seen that the present invention has wide versatility.

In the claims, prongs 63, 62 and 61 in the connector members 91 are respectively referred to as the first, second and third electrical connector terminals of the first supply cable disconnect means, and the prongs 54 and 53 in the connector member 71 are respectively referred to as the fourth and fifth electrical connector terminals of the auxiliary disconnect means.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. A submersible single-phase induction motor for operation immersed in water and in either two-wire supply cable installations with a motor capacitor located below the submersible motor or in three-wire supply cable installations with a motor control capacitor located remote from the submersible motor and with or without a motor capacitor below the motor, said motor being internally and permanently wired for two and three wire operation, comprising: a stator having an annular stator body and upper and lower motor end members on the upper and lower ends of the stator body defining a sealed rotor chamber internally of the annular stator body, a rotor in the rotor chamber having a rotor shaft extending out through said upper end member and having a running seal therewith, said annular stator body including a stator core; main and start motor windings on the core; and stator enclosure means enclosing said stator core and main and start windings and sealing the same from the rotor chamber and from the liquid surrounding the motor, a first supply cable disconnect means at the upper end of the motor including first and second and third electrical connector terminals sealed to said stator enclosure means and extending external of the stator enclosure means at the upper end of the stator body, auxiliary disconnect means at the lower end of the motor including fourth and fifth electrical connector terminals sealed to the stator enclosure means and extending external of the stator enclosure means at the lower end of the stator body, said main and start windings each having first and second ends, a common conductor means inside said stator enclosure means electrically connected to said first ends of each the main and start windings and to said first electrical connector terminal internally of the stator enclosure means, start conductor means inside said stator enclosure means electrically connected to said second end of the start winding and to each said electrical connector terminal and said fourth electrical connector terminal internally of said stator enclosure means, and main conductor means inside said stator enclosure means electrically connected to said second end of said main winding and to each of said third electrical connector terminal and said fifth electrical connector terminal internally of said stator enclosure means, a second supply cable disconnect means adapted for connection to a two-wire or three-wire supply cable and arranged to interfit with said terminals of said first supply cable disconnect means and to seal the same from the fluid surrounding the motor, said auxiliary disconnect means being adapted for connection to a motor capacitor, and means removably connected to the motor for sealing the fourth and fifth connector terminals of the auxiliary disconnect means from the liquid surrounding the motor when the motor is used in installations without a motor capacitor located below the motor.

* * * * *

PO-1050
(5/69)

UNITED STATES PATENT OFFICE
CERTIFICATE OF CORRECTION

Patent No. 3,761,750          Dated September 25, 1973

Inventor(s) Ronald E. Green

It is certified that error appears in the above-identified patent and that said Letters Patent are hereby corrected as shown below:

Column 6, line 49, before "electrical" (first occurrence) insert -- second --.

Signed and sealed this 15th day of January 1974.

(SEAL)
Attest:

EDWARD M. FLETCHER, JR.          RENE D. TEGTMEYER
Attesting Officer                    Acting Commissioner of Patents